US012770039B2

(12) United States Patent
Katayama

(10) Patent No.: US 12,770,039 B2
(45) Date of Patent: Oct. 20, 2026

(54) NEURAL NETWORK ARCHITECTURE FOR CONCURRENT LEARNING WITH ANTIDROMIC SPIKES

(71) Applicant: INTERNATIONAL BUSINESS MACHINES CORPORATION, Armonk, NY (US)

(72) Inventor: Yasunao Katayama, Hachiouji (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1169 days.

(21) Appl. No.: 17/573,926

(22) Filed: Jan. 12, 2022

(65) Prior Publication Data

US 2023/0222368 A1 Jul. 13, 2023

(51) Int. Cl.
*G06N 3/045* (2023.01)
*G06N 3/04* (2023.01)
(Continued)

(52) U.S. Cl.
CPC ............... *G06N 5/046* (2013.01); *G06N 3/04* (2013.01)

(58) Field of Classification Search
CPC ............ G06N 5/046; G06N 3/04; G06N 5/00; G06N 3/00
See application file for complete search history.

(56) References Cited

U.S. PATENT DOCUMENTS 9,269,043 B2 * 2/2016 Nugent .................. G06N 3/049
11,038,520 B1 * 6/2021 Narayanan ............ G06N 3/084
(Continued)

FOREIGN PATENT DOCUMENTS

CN 110163365 A * 8/2019
CN 113408714 A * 9/2021
WO 2023/134494 A1 7/2023

OTHER PUBLICATIONS

Mell et al., "The NIST Definition of Cloud Computing", National Institute of Standards and Technology, Special Publication 800-145. Sep. 2011, pp. 1-7.

(Continued)

*Primary Examiner* — Kamran Afshar
*Assistant Examiner* — Steven Phung
(74) *Attorney, Agent, or Firm* — CHIP LAW GROUP

(57) ABSTRACT

A neural network processing system having multiple layers is provided. Each layer includes a bidirectional Synaptic Network Channel (SNC) for concurrently transmitting weighted sums, $y_F(t)$'s and $x_B(t)$'s, as an elastic wave superposition of inputs, $x_F(t)$'s and $y_B(t)$'s, respectively. Each input is multiplied and added with corresponding weights w's encoded in variable splitters and combiners in forward and backward directions, respectively. Each layer includes unidirectional Signal Reshaping (SR) units, I's and L's for inference and learning, respectively, by generating inputs for a following layer in forward and backward directions from a current layer's weighted sums $y_F(t)$'s and $x_B(t)$'s, respectively. Each layer includes a Hybrid Coupler (HC) to connect the bidirectional SNC and the unidirectional SR units. Each layer includes a weight update unit to calculate each weight difference $\Delta w_{ij}$ using an input $y_{Bi}(t)$ or a weighted sum $y_{Fi}(t)$ and an input $x_{Fj}(t)$ to update a weight $w_{ij}$ for a current layer.

23 Claims, 12 Drawing Sheets

(51) Int. Cl.
*G06N 3/049* (2023.01)
*G06N 3/084* (2023.01)
*G06N 5/046* (2023.01)

(56) References Cited

U.S. PATENT DOCUMENTS

| | | | | |
|---|---|---|---|---|
| 2016/0196488 | A1 | 7/2016 | Ahn et al. | |
| 2020/0272815 | A1 | 8/2020 | Cao et al. | |
| 2021/0232900 | A1 * | 7/2021 | Lee | G06N 3/084 |
| 2022/0004851 | A1 * | 1/2022 | Bohnstingl | G06N 3/065 |

OTHER PUBLICATIONS

Huh, Dongsung, et al. "Gradient descent for spiking neural networks", arXiv preprint arXiv:1706.04698. Jun. 14, 2017, pp. 1-11.
Katayama, Yasunao, et al. "Wave-Based Neuromorphic Computing Framework for Brain-Like Energy Efficiency and Integration", IEEE Transactions on Nanotechnology, vol. 15, No. 5. Sep. 2016, pp. 762-769.
Shrestha, Sumit Bam, et al. "Slayer: Spike layer error reassignment in time", arXiv preprint arXiv:1810.08646. Sep. 5, 2018, pp. 1-10.
Chen, Ricky T. Q., et al. "Neural ordinary differential equations", arXiv preprint arXiv:1806.07366. Jun. 19, 2018, pp. 1-13.
Katayama, Yasunao, et al. "Channel Model for Spiking Neural Networks Inspired by Impulse Radio MIMO Transmission", In2019 IEEE Global Communications Conference (GLOBECOM). Dec. 9, 2019, pp. 1-6.
Burr, Geoffrey, et al. "Neuromorphic computing using non-volatile memory" Advances in Physics: X, Taylor & Francis Group. Jan. 2017, pp. 89-124.
Esser, Steven K., et al. "Convolutional networks for fast, energy-efficient neuromorphic computing", Proceedings of the national academy of sciences. Oct. 11, 2016, pp. 11441-11446.
Huh, Dongsung. "Curvature-corrected learning dynamics in deep neural networks", InInternational Conference on Machine Learning. Nov. 21, 2020, pp. 4552-4560.
Westerman, Wayne C., et al. "Antidromic Spikes Drive Hebbian Learning in an Artificial Dendritic Tree", Analog Integrated Circuits and Signal Processing. Feb. 18, 1999 pp. 141-152.
Zhang, Malu, et al. "Spike-Timing-Dependent Back Propagation in Deep Spiking Neural Networks", arXiv:2003.11837v1 [cs.NE]. Mar. 27, 2020, pp. 1-11.
Yellakuor, Baagyere Edward, et al. "A multi-spiking neural network learning model for data classification", IEEE Access. Apr. 2, 2020, pp. 1-13.
Lee, Chankyu, et al. Enabling spike-based backpropagation for training deep neural network architectures. Frontiers in neuroscience. Mar. 24, 2020, pp. 1-26.
Glsnn: A Multi-Layer Spiking Neural NetworkBased on Global Feedback Alignment and LocalSTDP Plasticity, Frontiers in. Nov. 12, 2020, pp. 1-17.
Fouda, M. E., et al. "Spiking Neural Networks for Inference and Learning: A Memristor-based Design Perspective", arXiv: 1909.01771v2 [cs.ET]. Oct. 9, 2019, pp. 1-26.
Katayama, Yasunao, et al. "Wave-Based Spiking Neural Network with Nano-Structured Electronics", In2019 IEEE 19th International Conference on Nanotechnology (IEEE-NANO). Jul. 22, 2019, pp. 157-162.
Nishitani, Y., et al. "Three-terminal ferroelectric synapse device with concurrent learning function for artificial neural networks", Journal of Applied Physics. Jun. 15, 2012, pp. 1-7.
International Search Report from PCT/CN2023/070050 dated May 16, 2023 (8 pages).

* cited by examiner

600

NEURAL NETWORK ARCHITECTURE FOR CONCURRENT LEARNING WITH ANTIDROMIC SPIKES

BACKGROUND

The present invention generally relates to artificial intelligence, and more particularly to a neural network architecture for concurrent learning with antidromic spikes.

Various spike-based neural network processing architectures have been explored using digital, analog, or more recently, elastic spikes signals, for future-generation energy-efficient Artificial Intelligence (AI) computing systems. Digital architectures employ digital/binary weights while analog architectures use variable resistors to encode weights.

However, an efficient learning strategy for spike-based neural network systems is still missing. On-line learning is less supported and, even if supported, arbitration is needed between inference and learning phases, affecting the throughput and latency as well as requiring extra complexities.

Hence, there is a need for an efficient learning strategy for spike-based neural network systems.

SUMMARY

According to aspects of the present invention, a neural network processing system having multiple layers is provided. Each of the multiple layer includes a bidirectional Synaptic Network Channel (SNC) for concurrently transmitting weighted sums, $y_F(t)$'s and $x_B(t)$'s, as an elastic wave superposition of inputs, $x_F(t)$'s and $y_B(t)$'s, respectively. Each of the inputs is multiplied and added with corresponding weights w s encoded in variable splitters and combiners in forward and backward directions, respectively. Each of the multiple layers further include unidirectional Signal Reshaping (SR) units, I's and L's for inference and learning, respectively, by generating inputs for a following layer in the forward and backward directions from a current layer's weighted sums $y_F(t)$'s and $x_B(t)$'s, respectively. Each of the multiple layers also include a Hybrid Coupler (HC) to connect the bidirectional SNC and the unidirectional SR units. Each of the multiple layers further includes a weight update unit to calculate each weight difference $\Delta w_{ij}$ using an input $y_{Bi}(t)$ or a weighted sum $y_{Fi}(t)$ and an input $x_{Fj}(t)$ to update a weight $w_{ij}$ for a current layer.

In an embodiment, the weights are shared between inference and learning.

In an embodiment, the unidirectional SR units reshape fragments of spike energies from a plurality of preceding neurons into a single spike signal for next-stage neural communication.

In an embodiment, input and output signals to and from the neural network processing system are unidirectional signals.

In an embodiment, both input $x_{Fi}(t)$ and weighted sum $x_{Bi}(t)$ coexist as independent signals in the bidirectional SNC until they are decoupled by the HC.

In an embodiment, both input $y_{Fi}(t)$ and weighted sum $y_{Bi}(t)$ coexist as independent signals in the bidirectional SNC until they are decoupled by the HC.

In an embodiment, the HC selectively transmits forward and backward signals to interface unidirectional and bidirectional components.

According to other aspects of the present invention, a computer-implemented method for concurrent machine learning is provided. The method includes concurrently transmitting, by a bidirectional Synaptic Network Channel (SNC), weighted sums, $y_F(t)$'s and $x_B(t)$'s, as an elastic wave superposition of inputs, $x_F(t)$'s and $y_B(t)$'s, respectively. Each of the inputs is multiplied and added with corresponding weights w s encoded in variable splitters and combiners in forward and backward directions, respectively. The method further includes performing, by unidirectional Signal Reshaping (SR) units, I's and L's inference and learning, respectively, by generating inputs for a following layer in the forward and backward directions from a current layer's weighted sums $y_F(t)$'s and $x_B(t)$'s, respectively. The method also includes connecting, by a Hybrid Coupler (HC), the bidirectional SNC and the unidirectional SR units. The method additionally includes calculating, by a weight update unit, each weight difference $\Delta w_{ij}$ using an input $y_{Bi}(t)$ or a weighted sum $y_{Fi}(t)$ and an input $x_{Fj}(t)$ to update a weight w for a current layer.

According to yet other aspects of the present invention, a computer program product for concurrent machine learning is provided. The computer program product includes a non-transitory computer readable storage medium having program instructions embodied therewith. The program instructions are executable by a computer to cause the computer to perform a method. The method includes concurrently transmitting, by a bidirectional Synaptic Network Channel (SNC), weighted sums, $y_F(t)$'s and $x_B(t)$'s, as an elastic wave superposition of inputs, $x_F(t)$'s and $y_B(t)$'s, respectively. Each of the inputs is multiplied and added with corresponding weights w's encoded in variable splitters and combiners in forward and backward directions, respectively. The method further includes performing, by unidirectional Signal Reshaping (SR) units, I's and L's inference and learning, respectively, by generating inputs for a following layer in the forward and backward directions from a current layer's weighted sums $y_F(t)$'s and $x_B(t)$'s, respectively. The method also includes connecting, by a Hybrid Coupler (HC), the bidirectional SNC and the unidirectional SR units. The method additionally includes calculating, by a weight update unit, each weight difference $\Delta w_{ij}$ using an input $y_{Bi}(t)$ or a weighted sum $y_{Fi}(t)$ and an input $x_{Fj}(t)$ to update a weight $w_{ij}$ for a current layer.

According to still further aspects of the present invention, a neural network processing system having multiple layers is provided. Each of the multiple layer includes a bidirectional Synaptic Network Channel (SNC) for concurrently transmitting weighted sums, $y_F(t)$'s and $x_B(t)$'s, as an elastic wave superposition of inputs, $x_F(t)$'s and $y_B(t)$'s, respectively. Each of the inputs is multiplied and added with corresponding weights w's encoded in variable splitters and combiners in forward and backward directions, respectively. Each of the multiple layers further include unidirectional Signal Reshaping (SR) units, I's and L's for inference and learning, respectively, by generating inputs for a following layer in the forward and backward directions from a current layer's weighted sums $y_F(t)$'s and $x_B(t)$'s, respectively. Each of the multiple layers also include a Hybrid Coupler (HC) to connect the bidirectional SNC and the unidirectional SR units. Each of the multiple layers further includes a weight update unit to calculate each weight difference $\Delta w_{ij}$ using an input $y_{Bi}(t)$ or a weighted sum $y_{Fi}(t)$ and an input $x_{Fj}(t)$ to update a weight $w_{ij}$ for a current layer. The SR units I's decide whether to transmit forward spike signals into the following layer during inference by thresholding and reshaping weighted sums $y_{Fi}(t)$'s. The SR units L's decide whether to transmit backward spike signals into the preceding layer by thresholding and reshaping weighted sums $x_{Bi}(t)$'s.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a neural network architecture for concurrent learning with antidromic spikes.

Embodiments of the present invention facilitate a new continuous-time computing model that improves the energy and functional efficiencies of AI systems. Unlike conventional step-based computing models that overwhelmingly dissipate energy and information by overriding the inertia in underlying physical degrees of freedom, the proposed model naturally exploits non-dissipative dynamics of spikes and spike ensembles as elastic waves for better coding and processing efficiencies.

Embodiments of the present invention can concurrently execute various inference and learning algorithms, including Hebbian, Spike Time-Dependent Plasticity (STDP), and backpropagation.

Embodiments of the present invention can support various computing primitives such that continuous-time inference and learning algorithm of different types can be ported on top of it.

Embodiments of the present invention can be implemented using hardware and/or software emulation by virtualizing hardware.

Some exemplary advantages of various embodiments of the present invention include, but are not limited to, the following. One advantage is a higher throughput by concurrently processing inference and learning without bus arbitration. Another advantage is simultaneous lower latency to better track rapidly changing inputs by updating weights at virtually any time with less downtime. Yet another advantage is a simpler architecture with shared weights for inference and learning, without extra complexities (e.g., circuit, control, etc.) for bus arbitration. Still another advantage is allowing for native and energy-efficient processing of temporally-coded spikes without arbitration and thus with less temporal jitter, hence achieving online and real-time operations without any down time period.

Figure 1:
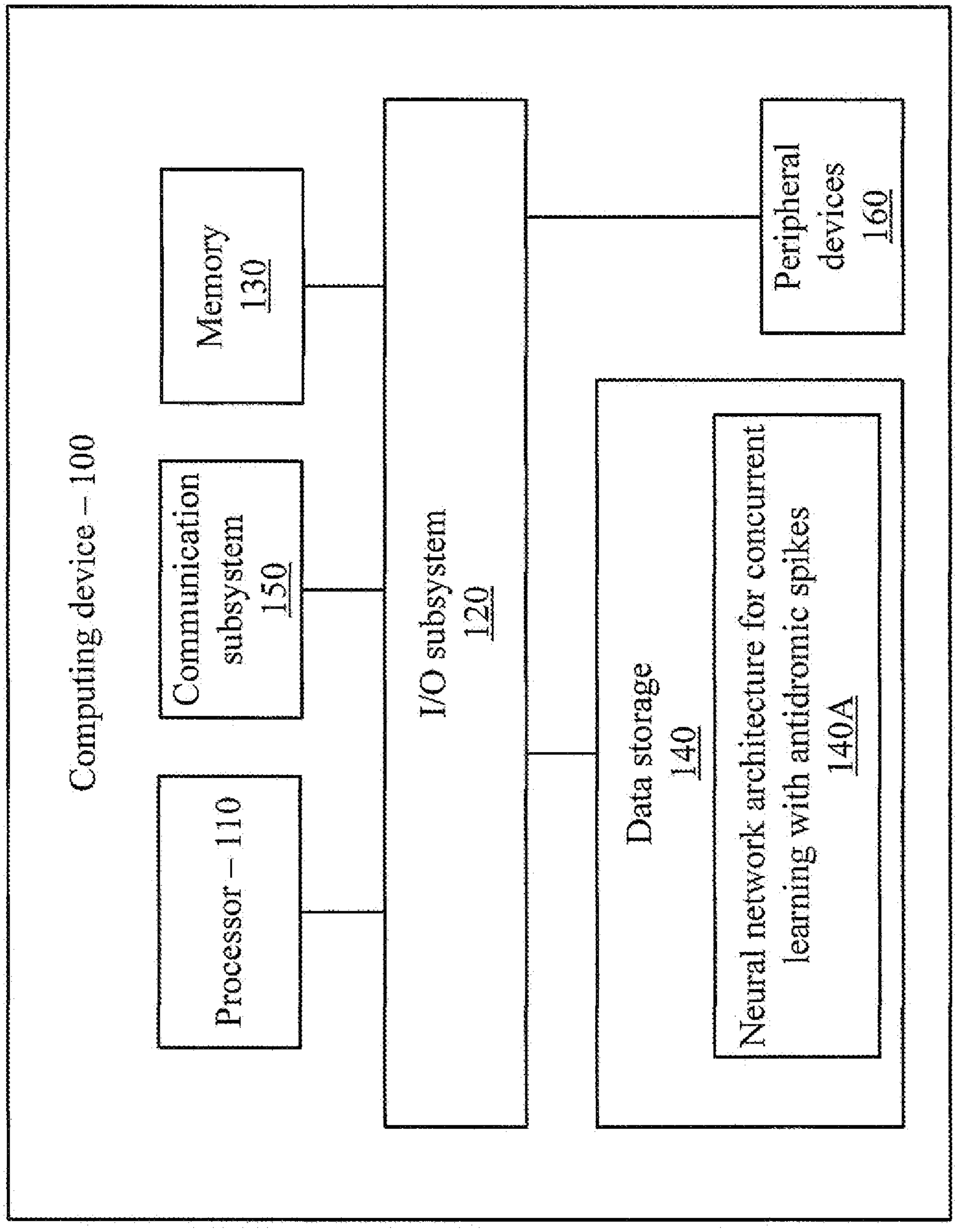
FIG. 1 is a block diagram showing an exemplary computing device, in accordance with an embodiment of the present invention.

FIG. 1 is a block diagram showing an exemplary computing device 100, in accordance with an embodiment of the present invention. In this example, the computing device 100 is configured to include a neural network architecture for concurrent learning with antidromic spikes 140A in the data storage 140. Alternatively, the computing device 100 can be configured to include a neural network architecture for concurrent learning with antidromic spikes in other blocks, such as processor 110, I/O subsystem 120, memory 130, communication subsystem 150.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for a neural network architecture for concurrent learning with antidromic spikes. In another embodiment, the computing device 100 includes the neural network as a separate hardware element coupled to the I/O subsystem 120. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 11-12). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
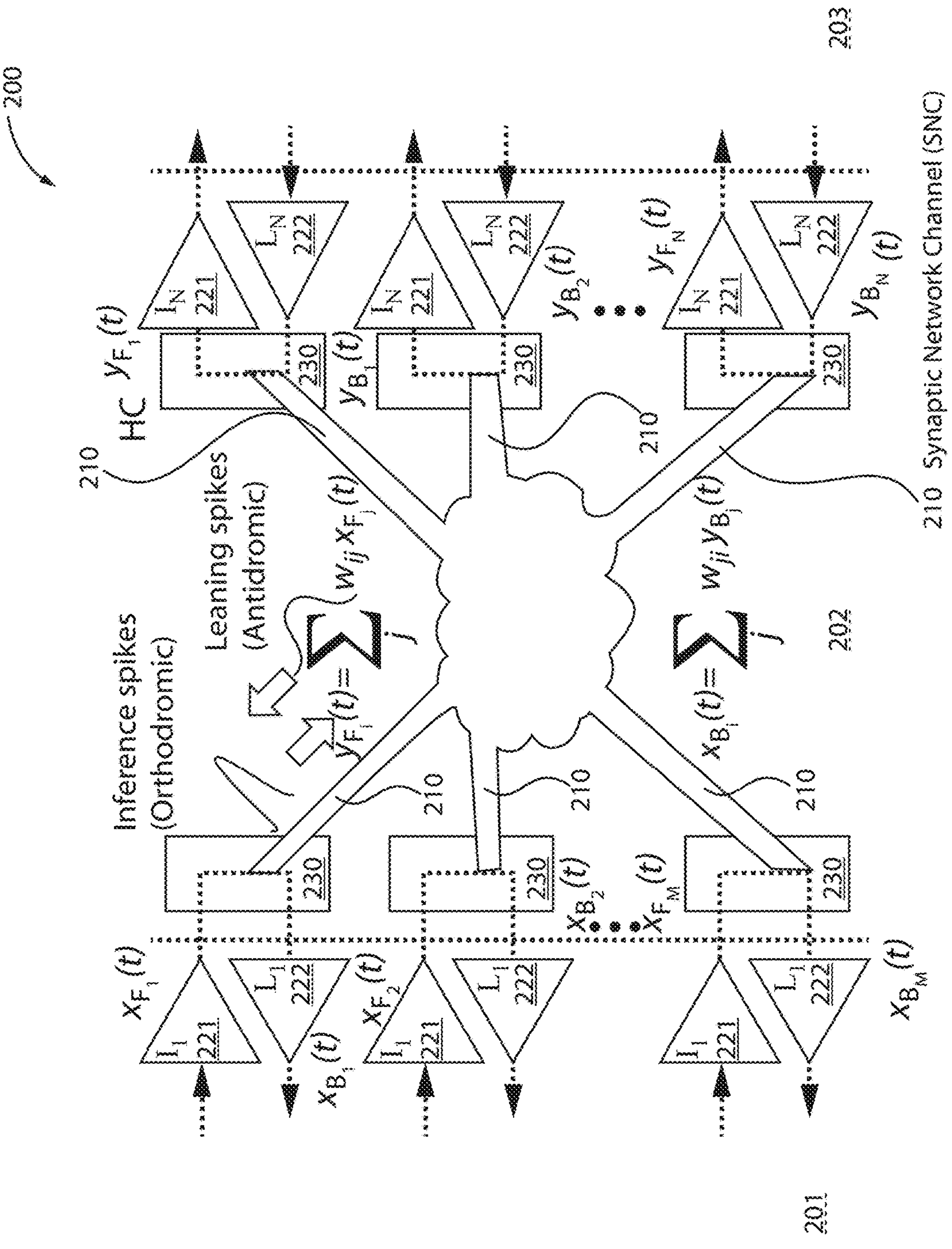
FIG. 2 is a block diagram showing an exemplary neural network processing system, in accordance with an embodiment of the present invention.

These and other variations of a hardware processor subsystem are also contemplated in accordance with embodiments of the present invention FIG. 2 is a block diagram showing an exemplary neural network processing system 200, in accordance with an embodiment of the present invention. The neural network architecture for concurrent learning with antidromic spikes can be configured with single or multiple layers of the NN system 200.

In an embodiment, the neural network processing system 200 includes specific computing model and algorithms based on elastic spikes for learning weights and other parameters under a given neural network architecture. Spikes including elastic waves allows for a natural implementation of the present invention by taking advantage of bidirectional spike signals in superposition. In other embodiments, other types of computing models can also be used as readily appreciated by one of ordinary skill in the art given the teachings of the present invention provided herein, while maintaining the spirit of the present invention.

The NN processing system 200 can incorporate orthodromic and antidromic spike signals $x_F(y)$'s and $x_B(t)$'s for preceding layer as inputs and $y_F(t)$'s and $y_B(t)$'s for the following layer, respectively by taking advantage of the forementioned bidirectional elastic spikes. The input and output signals are assumed to be conventional unidirectional signals for naturally embedding the NN processing system 200 in any portion of the computing device 100

The NN processing system 200 includes a Synaptic Network Channel (SNC) 210, Signal Reshaping (SR) units I's 221 and L's 222 for inference and learning, respectively. Hybrid Couplers (HCs) 230, Multiport Bidirectional Couplers 235 including Variable Splitters and Combiners, and weight update units U's 240 are included in SNC 210.

The NN processing system 200 is shown relative to a previous layer 201, a current layer 202, and a following layer 203.

The Synaptic Network Channel (SNC) 210 can concurrently transmit weighted sums, $y_F(t)$'s and $x_B(t)$'s, as elastic wave superposition of inputs, $x_F(t)$'s and $y_B(t)$'s, each multiplied with weights encoded in variable splitters and combiners, $w_{ij}$ and $w_{ji}=w^T_{ij}$, in forward (orthodromic) and backward (antidromic) directions, respectively. As used herein in relation to embodiments of the present invention, "elastic wave superposition of signals" refers to both $x_{Fj}(t)$ and $x_{Bi}(t)$ as well as $y_{Fj}(t)$ and $y_{Bi}(t)$ can coexist as independent signals in the same SNC until they are decoupled by HC 230. It is noted that, in addition to the bidirectional nature of spike wave signals, their superposition during the weighted sum computation from various preceding neurons during inference can increase the desired signal amplitude with constructive interference while decreasing the undesired signals with destructive interference. This is because of another nature of spike wave signals. The same effect can occur for the backward weighted sum computing during learning.

The Signal Reshaping (SR) units, unit I's 221 and unit L's 222 for inference and learning, respectively, can generate inputs for a following layer in the forward and backward directions from the current layer yF(t)'s and xB(t)'s, respectively. The SR units I's 221 decide whether to transmit forward spike signals into the following layer 203 during inference by appropriately thresholding and reshaping yF(t) 's, respectively. The SR units L's 222 decide whether to transmit backward spike signals into the preceding later 201 by appropriately (and differently) thresholding and reshaping xB(t)'s, respectively. The reshaping operation can include an integrate and fire function with leakage, which is more similar to standard biological neuron models, but the thresholding without any integration can perform more elastic neuron operations.

The Hybrid Couplers (HCs) 230 can connect the bidirectional SNC 210 and the unidirectional SR units 221 and 222. To that end, each of the HCs 230 is connected to a respective I unit 211 and L unit 222. The HCs enable concurrent processing of inference and learning without bus arbitration. The HCs 230 selectively transmit forward and backward signals in order to interface unidirectional and bidirectional components.

Figure 3:
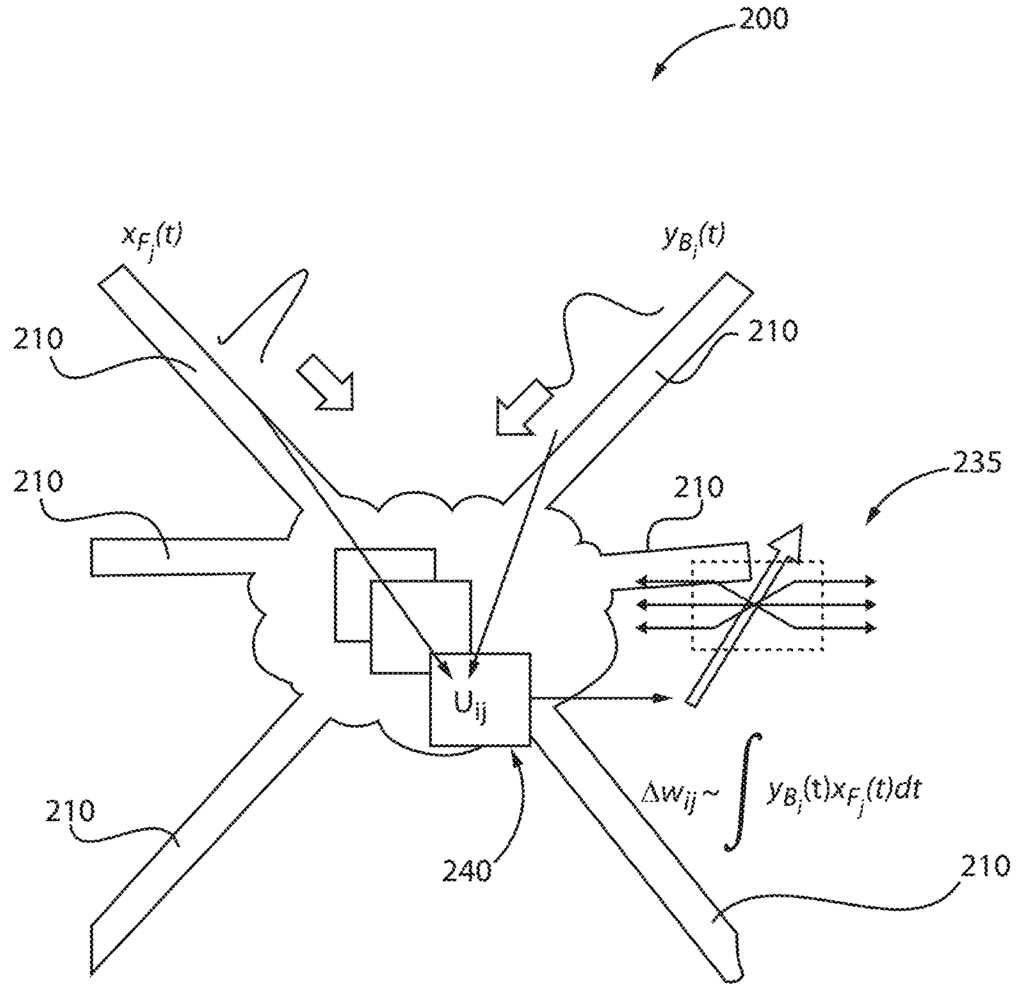
FIG. 3 is a diagram showing various aspects of system 200, in accordance with an embodiment of the present invention.

The weight update unit $U_{ij}$ 240 calculates $\Delta w_{ij}$ using $y_{Bi}(t)$ or $y_{Fi}(t)$, and $x_{Fj}(t)$ to update $w_{ij}$, by using an appropriate learning algorithm of choice discussed later FIG. 3 is a diagram showing various aspects of system 200, in accordance with an embodiment of the present invention. More specifically, FIG. 3 shows a further details of the SNC 230 with an exemplary update of weight $w_{ij}$ of the multiport bidirectional coupler 235 and the weight update unit $U_{ij}$ 240 for calculating a cross correlation function of $y_{Bi}(t)$ and $x_{Fj}(t)$.

As one example, when $T_I=T_L=10$ ns, D (layer depth)=5, and N (update per phase)=10, then improvements are as follows:

Latency 250 ns=>200 ns

Throughput 10/0.3 M/s=>10/0.1 M/s.

Figure 4:
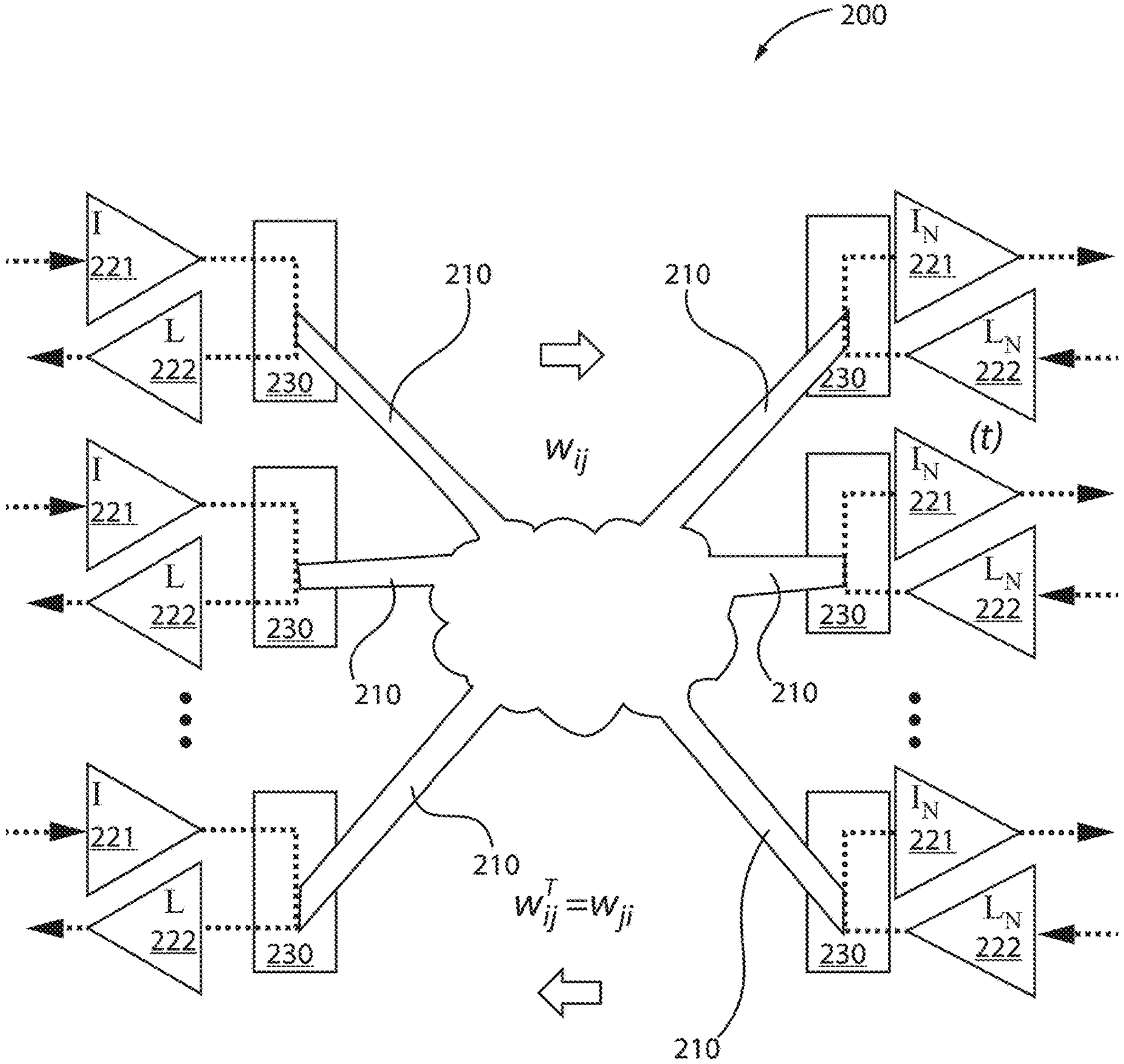
FIG. 4 is a diagram further summarizing an effect of a bidirectional feature of system 200, in accordance with an embodiment of the present invention.

FIG. 4 is a diagram further summarizing an effect of system 200, in accordance with an embodiment of the present invention.

The bidirectional feature of the SNC 210 enables concurrent and nonblocking calculation of weighted sum using $w_{ij}$ for inference and using $w^T_{ij}=w_{ji}$ for learning at higher throughput without arbitrating the SNC 210, but still allows for interfacing conventional components with unidirectional IO interfaces in the computing system 100.

Figure 5:
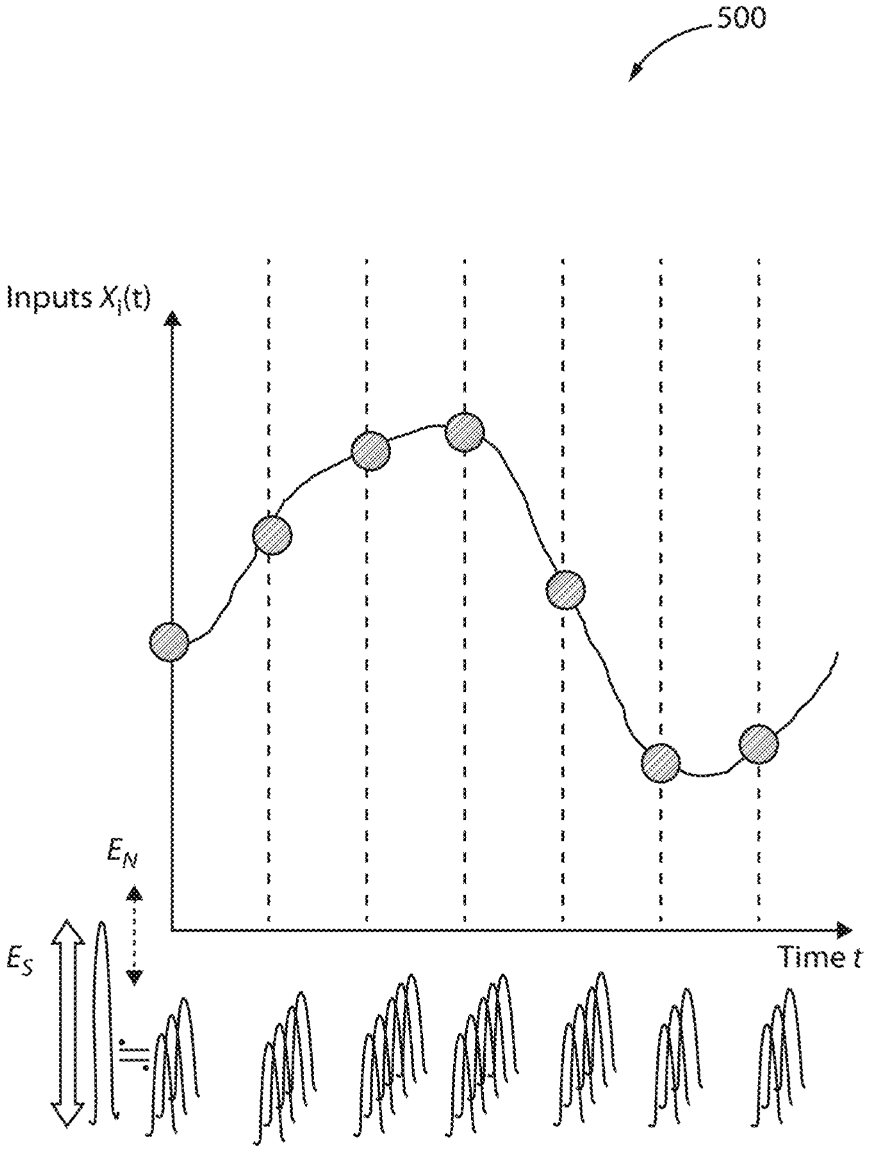
FIG. 5 is a diagram showing an exemplary plot of inputs $x_i(t)$ versus time t, to which the present invention can be applied.

FIG. 5 is a diagram showing an exemplary plot 500 of inputs $x_i(t)$ versus time t, to which the present invention can be applied. The plot 500 corresponds to an analog amplitude scenario where a large number of spikes are generated as shown.

Pertaining to the analog amplitude scenario, the number of bits is calculated as follows:

$$\text{number of bits} \sim \log\frac{E_S}{E_N} + \ldots$$

where $E_S$ denotes the average signal power, and where $E_N$ denotes the average noise power.

Figure 6:
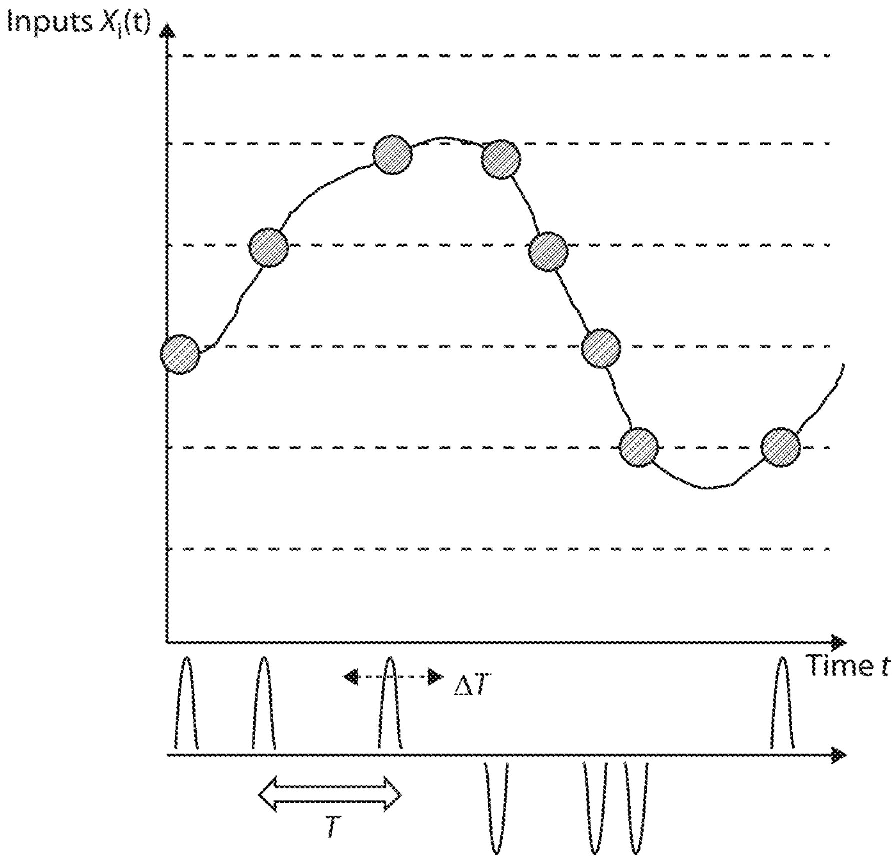
FIG. 6 is a diagram showing an exemplary plot of inputs $x_i(t)$ versus time t, in accordance with an embodiment of the present invention.

FIG. 6 is a diagram showing an exemplary plot 600 of inputs $x_i(t)$ versus time t, in accordance with an embodiment of the present invention. The plot 600 corresponds to a temporal elastic scenario where the number of spikes generated is significantly reduced as shown, providing improved energy efficiency.

Pertaining to the temporal elastic scenario, the number of bits is calculated as follows:

$$\text{number of bits} \sim \log\frac{T}{\Delta T} + \ldots$$

where T denotes the max. inter-spike spike interval, and where $\Delta T$ denotes the temporal jitter.

Figure 7:
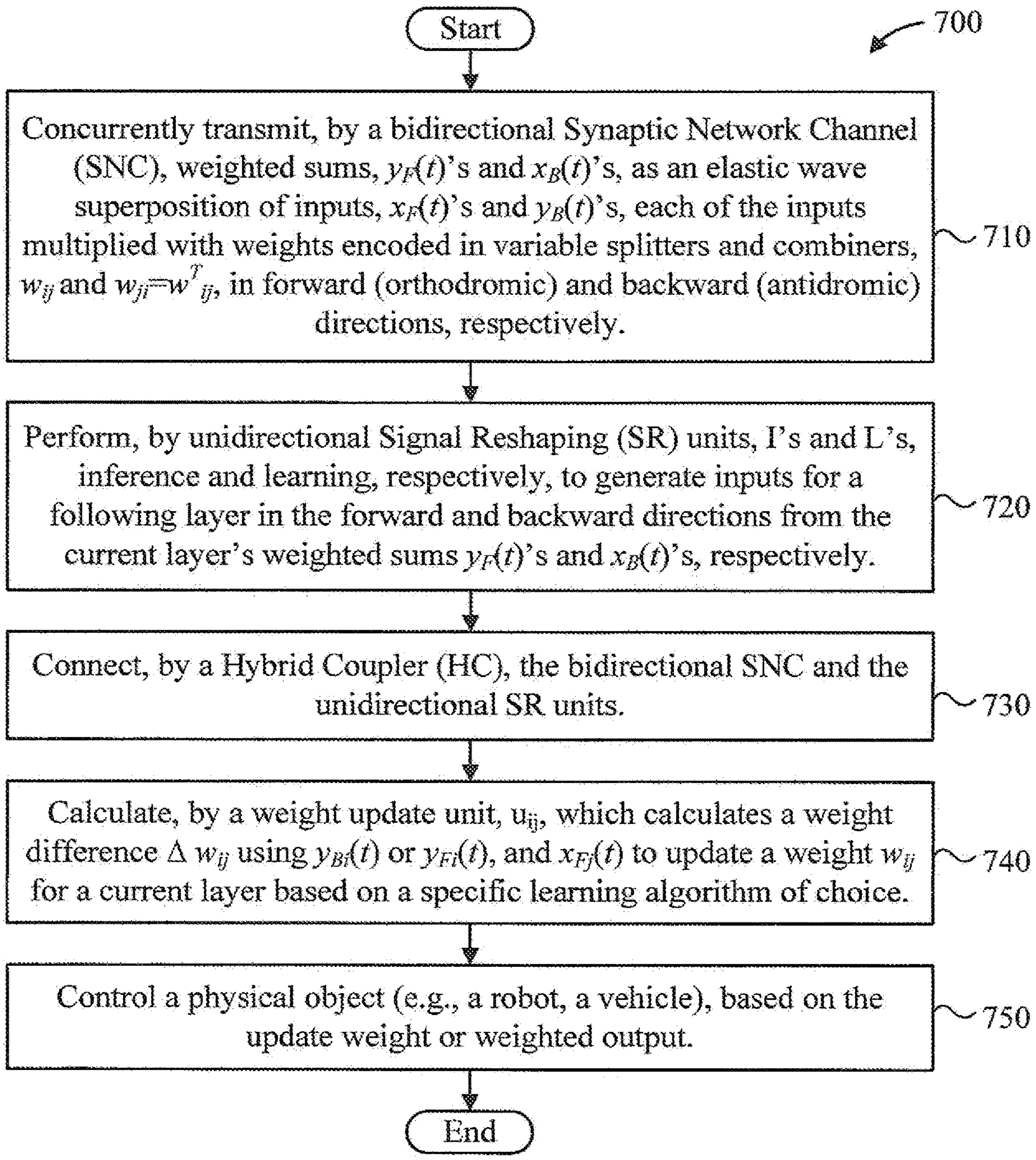
FIG. 7 is a flow diagram showing an exemplary computer-implemented method for concurrent learning with Antidromic spikes, in accordance with an embodiment of the present invention.

FIG. 7 is a flow diagram showing an exemplary computer-implemented method for concurrent learning with Antidromic spikes, in accordance with an embodiment of the present invention.

At block 710, concurrently transmit, by a bidirectional Synaptic Network Channel (SNC), weighted sums, $y_F(t)$'s and $x_B(t)$'s, as an elastic wave superposition of inputs, $x_F(t)$'s and $y_B(t)$'s, each of the inputs multiplied with weights encoded in variable splitters and combiners, $w_{ij}$ and $w_{ji}=w^T_{ij}$, in forward (orthodromic) and backward (antidromic) directions, respectively.

At block 720, perform, by unidirectional Signal Reshaping (SR) units, I's and L's, inference and learning, respectively, to generate inputs for a following layer in the forward and backward directions from the current layer's weighted sums $y_F(t)$'s and $x_B(t)$'s, respectively.

At block 730, connect, by a Hybrid Coupler (HC), the bidirectional SNC and the unidirectional SR units.

At block 740, calculate, by a weight update unit, $u_{ij}$, which calculates a weight difference $\Delta w_{ij}$ using $y_{Bi}(t)$ or $y_{Fi}(t)$, and $x_{Fj}(t)$ to update a weight $w_{ij}$ for a current layer based on a specific learning algorithm of choice.

At block 750, control a physical object (e.g., a robot, a vehicle), based on the update weight or weighted output. Block 750 can include and/or otherwise involve one or more decisions depending upon the implementation.

It is important to show that the proposed invention can support not only a specific learning algorithm, but a wide variety of algorithms of different kinds.

Let us first find out how unsupervised algorithms, such as Hebbian and STDP, can be represented with the present invention by taking $y_{Bi}(t)$ of the present layer as $x_{Fi}(t)$ of the following layer. The weight update rules can be translated using the following cross-correlation of presynaptic and post synaptic signals. For Hebbian learning, the weight update rule can be described as $$\Delta wij \sim \mathrm{Re}\int y_{Bi}(t)x_{Fj}(t)dt.$$

For STDP, the weight update rules can be represented using the same cross-correlation as $$\Delta wij \sim \mathrm{Im}\int y_{Bi}(t)x_{Fj}(t)dt.$$

Note that the time of the backward signal, in $x_{Bi}$ (t) and $y_{Bi}$(t), may need to appropriately incorporate time reversal effects with various delays, depending on implementation options. The concurrent and nonblocking feature in SNC can better control the influence of such time reversal and round-trip delay for hardware implementations with slow signals in long postsynaptic paths. Specific functional forms of weight updating can be realized by applying an additional filter in front for appropriate temporal dependences. When higher frequency components of weight updating can be filtered out, the influence of time reversal and round-trip delay will matter less.

Another example is an application to popular backpropagation learning algorithm as a supervised counterpart.

The learning algorithm is described first by defining the error signal $e_i$(t) at an neuron in the last layer by using the difference between desired and actual $y_{Bi}$(t). Alternatively e (t) can be generated by differentiating a specific loss function, such as cross entropy loss function.

Then the errors are backpropagating in each layer of NN processing system 200 by substituting $y_{Bi}(t)=f'_i(t)e_i(t)$ and $x_{Bi}(t)=e_j(t)$ as follows:

$$e_j(t)=\sum_i f_i'(t)w_{ji}e_i(t).$$

$f'_i(t)$ is the function that can be embedded into the L's 222 to control backward antidromic spike firing. Typically, forward orthodromic spike firing in the I's 221 and backward antidromic spike firing in the L's 222 can be synchronized.

A description will now be given of energy and functional efficiencies, in accordance with an embodiment of the present invention.

Since the present computing model still requires energy associated with spike creation and annihilation, it is essential to reduce the number of spikes for energy efficiency. In other words, energy efficiency can be further brought with by efficient spike coding and processing. The log coding of spikes in the new computing model can save the number of spikes exponentially, compared with conventional rate coding. The number of spikes can further be saved by temporal coding and processing, such as inter-spike interval coding. The new computing model can better maintain the temporal precision thanks to elastic signal dynamics with LC-based wave dynamics rather than RC based diffusive dynamics. As the temporal precision of spike dynamics is better maintained with the new computing model, a larger amount of information can be encoded even with using only 2 spikes.

Figure 8:
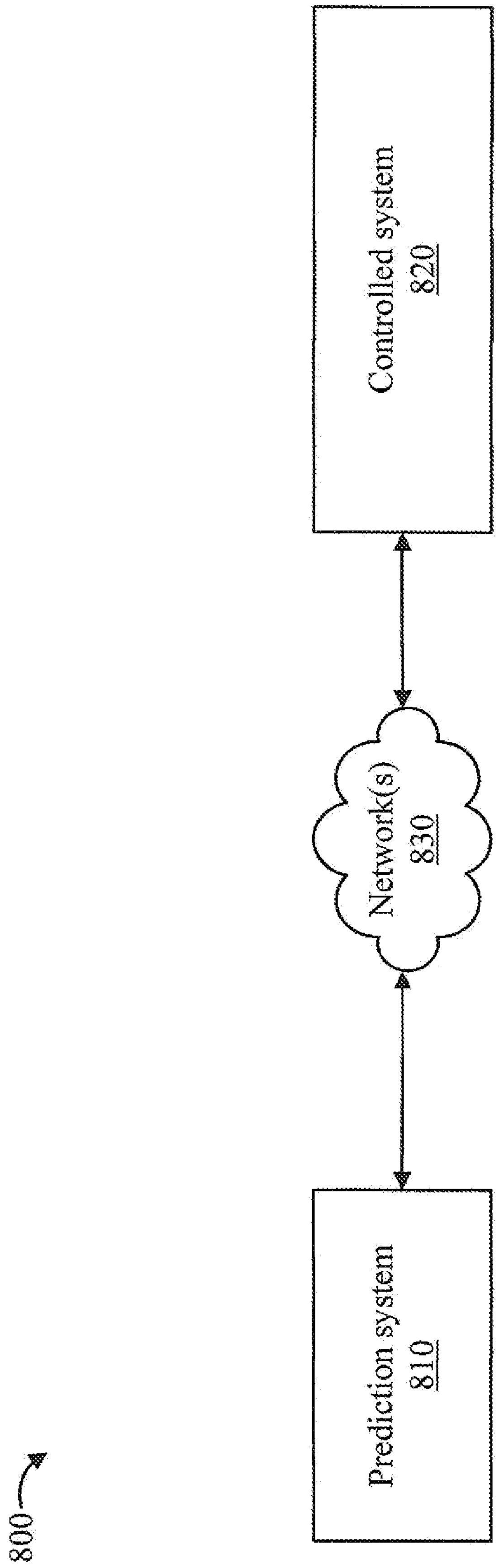
FIG. 8 is a block diagram showing an exemplary environment to which the present invention can be applied, in accordance with an embodiment of the present invention.

FIG. 8 is a block diagram showing an exemplary environment 800 to which the present invention can be applied, in accordance with an embodiment of the present invention.

The environment 800 includes a Reinforcement Learning (RL) system 810 and a controlled system 820. While an RL system is described with respect to the embodiments of FIGS. 8 and 9, other types of artificial intelligence systems can also be used, while maintaining the spirit of the present invention. The RL system 810 and the controlled system 820 are configured to enable communications therebetween. For example, transceivers and/or other types of communication devices including wireless, wired, and combinations thereof can be used. In an embodiment, communication between the RL system 810 and the controlled system 820 can be performed over one or more networks, collectively denoted by the figure reference numeral 830. The communication can include, but is not limited to, a sequence of tasks and/or a set of rewards data and/or predictions. The controlled system 820 can be any type of processor-based system such as, for example, but not limited to, a robotic system or device, a music recommendation system, a factory management system, and so forth. The controlled system 820 can be controlled based on a prediction generated by the RL system 810. Examples of potential applications to which the RL system 810 can be applied that have multiple unrelated rewards include the following:

(1) Robotics: (a) Optimize balance; and (b) Optimize moving to a goal.

(2) Music recommendation system: (a) Minimize user skipping songs; and (b) Maximize "song variety".

(3) Factory management: (a) Keep production quality above a certain level; (b) Minimize energy costs; and (c) Maximize worker happiness. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the RL system 810 can be implemented as a node in a cloud-computing arrangement. In an embodiment, a single RL system 810 can be assigned to a single controlled system or to multiple controlled systems e.g., different robots in an assembly line, and so forth). These and other configurations of the elements of environment 800 are readily determined by one of ordinary skill in the art given the teachings of the present invention provided herein, while maintaining the spirit of the present invention.

Figure 9:
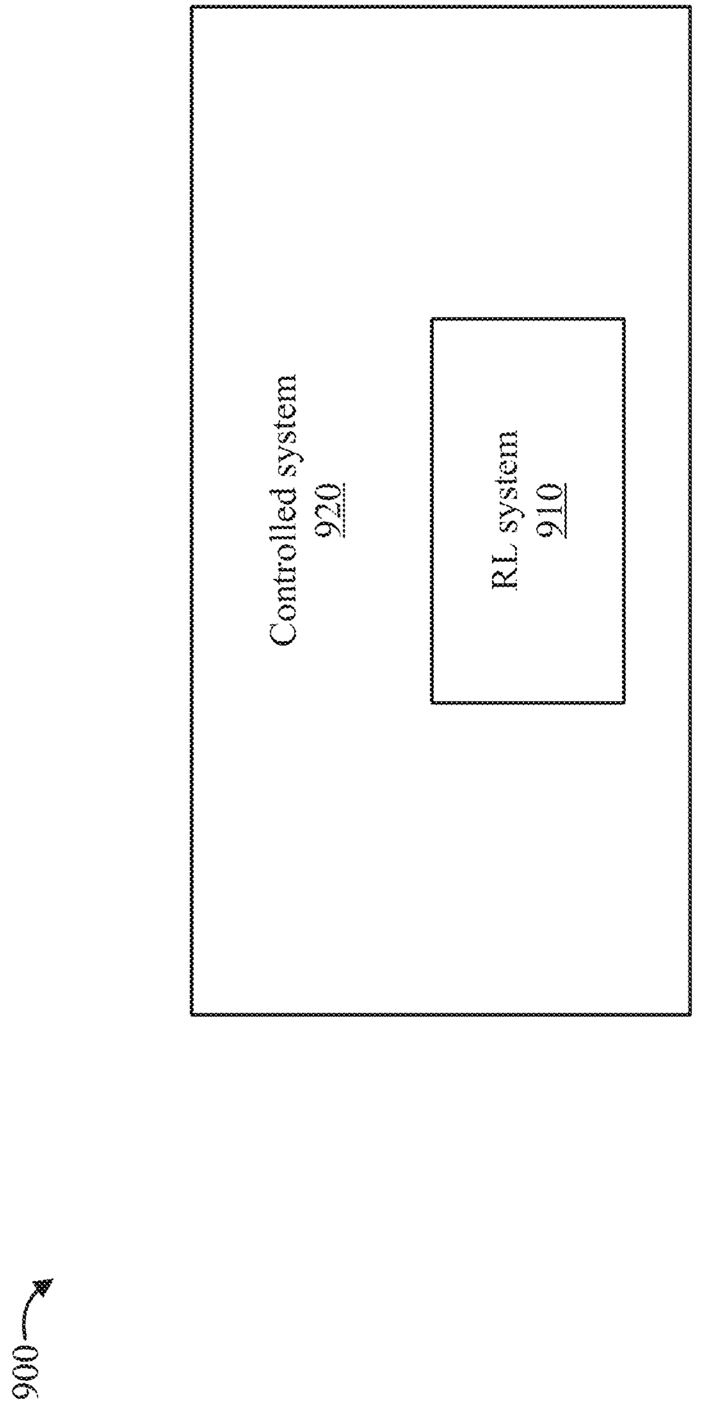
FIG. 9 is a block diagram showing another exemplary environment to which the present invention can be applied, in accordance with an embodiment of the present invention.

FIG. 9 is a block diagram showing another exemplary environment 900 to which the present invention can be applied, in accordance with an embodiment of the present invention.

The environment 900 includes a controlled system 920 that, in turn, includes a RL system 910. One or more communication buses and/or other devices can be used to facilitate inter-system, as well as intra-system, communication. The controlled system 920 can be any type of processor-based system such as, for example, but not limited to, a robotics system/device, a music recommendation system, a factory management system, and so forth.

Other than RL system 910 being included in system 920, operations of these elements in environments 800 and 900 are similar. Accordingly, elements 910 and 920 are not described in further detail relative to FIG. 9 for the sake of brevity, with the reader respectively directed to the descriptions of elements 810 and 820 relative to environment 800 of FIG. 8 given the common functions of these elements in the two environments 800 and 900.

Figure 10:
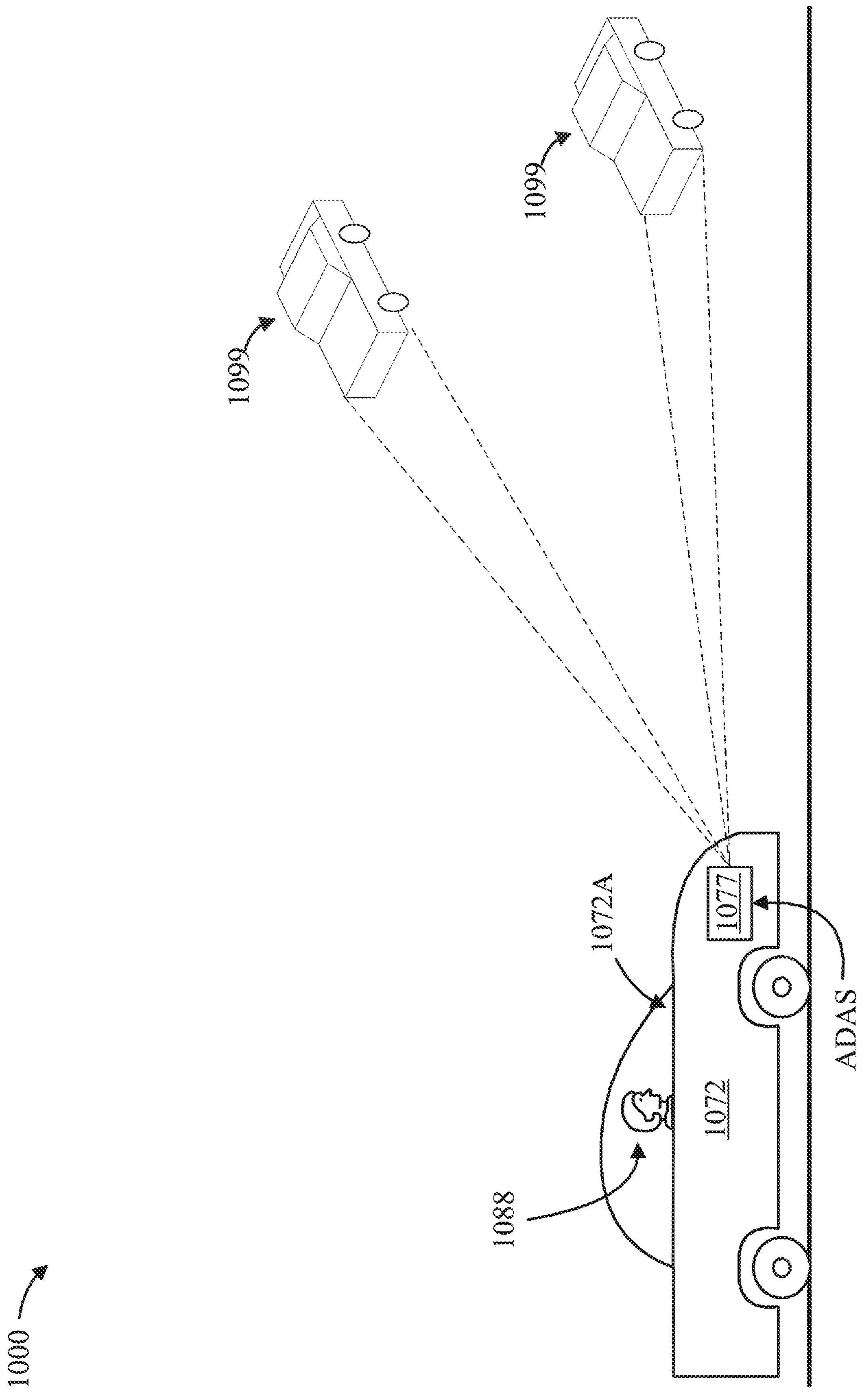
FIG. 10 is a block diagram showing yet another exemplary environment to which the present invention can be applied, in accordance with an embodiment of the present invention.

FIG. 10 is a block diagram showing yet another exemplary environment 1000 to which the present invention can be applied, in accordance with an embodiment of the present invention.

In the environment 1000, a user 1088 is located in a scene with multiple objects 1099, each having their own locations and trajectories. The user 1088 is operating a vehicle 1072 (e.g., a car, a truck, a motorcycle, etc.) having an Advanced Driver Assistance System (ADAS) 1077.

Responsive to the camera inputs transformed in vectors representing a scene, a strategic decision is made. To that end, the ADAS 1077 can control, as an action corresponding to a decision, for example, but not limited to, steering, braking, and accelerating systems. Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 1000) may interface with the user through one or more systems of the vehicle 1072 that the user is operating. For example, the system of the present invention can provide the user information through a system 1072A (e.g., a display system, a speaker system, and/or some other system) of the vehicle 1072. Moreover, the system of the present invention (e.g., system 1000) may interface with the vehicle 1072 itself (e.g., through one or more systems of the vehicle 1072 including, but not limited to, a steering system, a braking system, an acceleration system, a steering system, a lighting (turn signals, headlamps) system, etc.) in order to control the vehicle and cause the vehicle 1072 to perform one or more actions. In this way, the user or the vehicle 1072 itself can navigate around these objects 1099 to avoid potential collisions there between. The providing of information and/or the controlling of the vehicle can be considered actions that are determined in accordance with embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
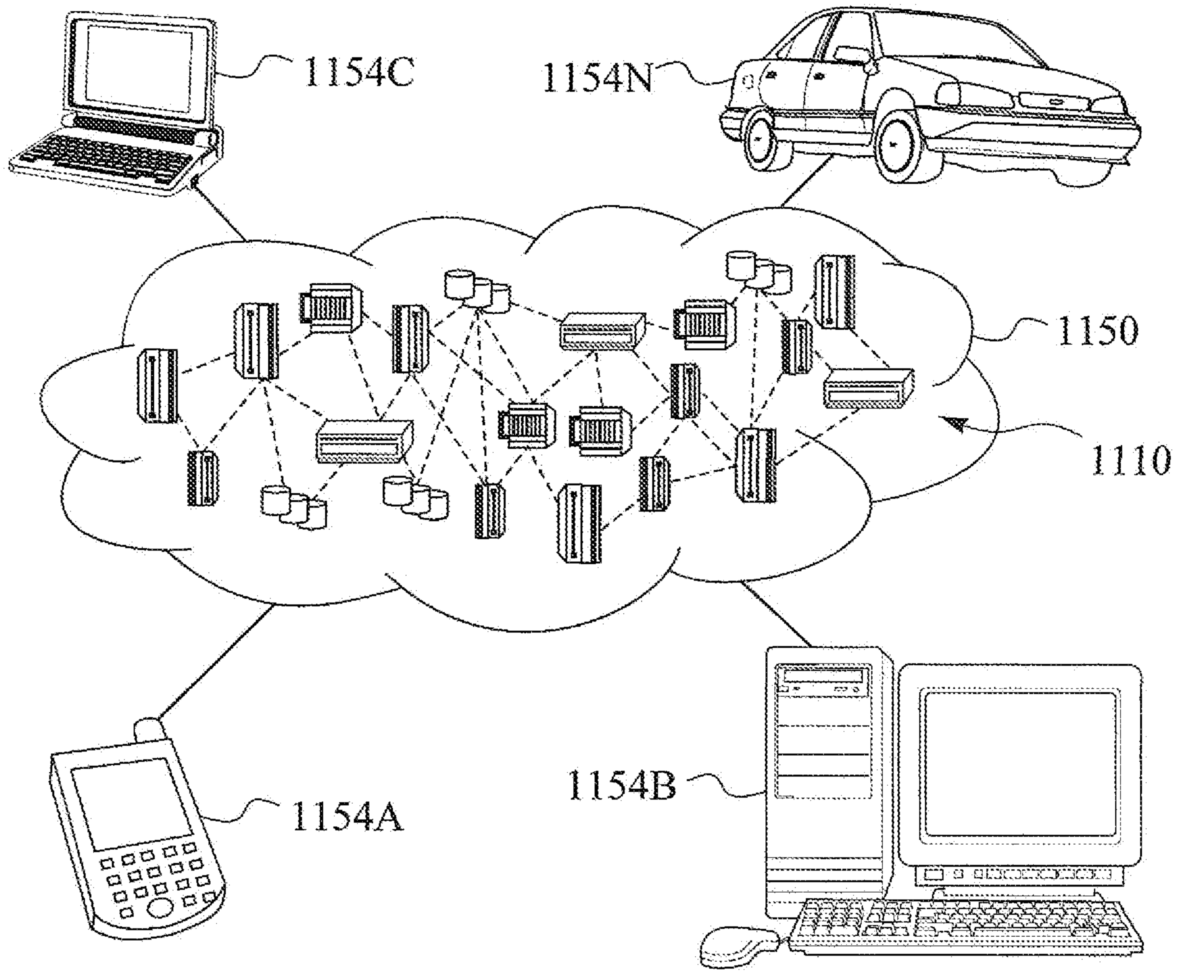
FIG. 11 is a block diagram showing an illustrative cloud computing environment having one or more cloud computing nodes with which local computing devices used by cloud consumers communicate, in accordance with an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
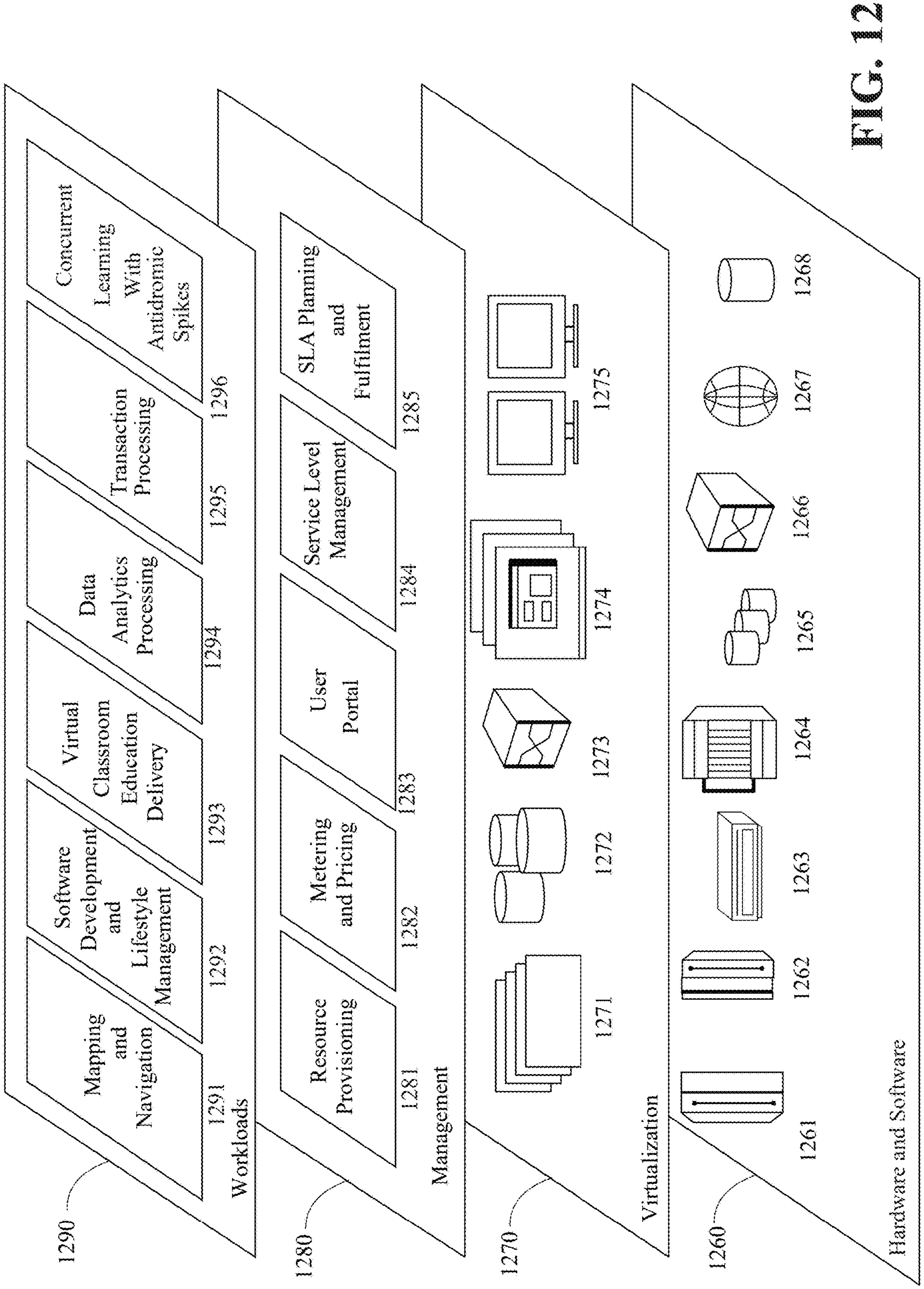
FIG. 12 is a block diagram showing a set of functional abstraction layers provided by a cloud computing environment, in accordance with an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and concurrent learning with antidromic spikes 1296.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A neural network processing system having multiple layers, each layer of the multiple layers comprising:

a bidirectional Synaptic Network Channel (SNC) for concurrently transmitting weighted sums, $y_F(t)$'s and $x_B(t)$'s, as an elastic wave superposition of inputs, $x_F(t)$'s and $y_B(t)$'s, respectively, each input of the inputs multiplied and added with corresponding weights w's encoded in variable splitters and combiners in a forward direction and a backward direction, respectively;

unidirectional Signal Reshaping (SR) units, I's and L's for inference and learning, respectively, wherein the inference and the learning are based on generating inputs for a following layer of the multiple layers in the forward direction and the backward direction from the weighted sums $y_F(t)$'s and $x_B(t)$'s of a current layer of the multiple layers, respectively, wherein the unidirectional SR units I's determine whether to transmit forward spike signals into the following layer during the inference by thresholding and reshaping weighted sums $y_F(t)$'s, the unidirectional SR units L's determine whether to transmit backward spike signals into a preceding layer of the multiple layers by thresholding and reshaping weighted sums $x_B(t)$'s, and the thresholding and the reshaping of the weighted sums $x_B(t)$'s by the unidirectional SR units L's are different from the thresholding and the reshaping of the weighted sums $y_F(t)$'s by the unidirectional SR units I's;

a Hybrid Coupler (HC) to connect the bidirectional SNC and the unidirectional SR units; and a weight update unit to calculate each weight difference $\Delta w_{ij}$ using an input $y_{Bi}(t)$ or a weighted sum $y_{Fi}(t)$ and an input $x_{Fj}(t)$ to update a weight $w_{ij}$ for the current layer.

2. The neural network processing system of claim 1, wherein the corresponding weights are shared between the inference and the learning.

3. The neural network processing system of claim 1, wherein the unidirectional SR units perform the inference and the learning using a Hebbian algorithm.

4. The neural network processing system of claim 1, wherein the unidirectional SR units perform the inference and the learning using a Spike Time-Dependent Plasticity algorithm.

5. The neural network processing system of claim 1, wherein the unidirectional SR units perform the inference and the learning using a backpropagation algorithm.

6. The neural network processing system of claim 1, wherein the unidirectional SR units reshape fragments of spike energies from a plurality of preceding neurons into a single spike signal for next-stage neural communication in the following layer.

7. The neural network processing system of claim 1, wherein the unidirectional SR units generate the inputs for the following layer in the forward direction and the backward direction from $y_F(t)$'s or $x_F(t)$'s of the current layer, and $x_B(t)$'s of the current layer, respectively, by calculating a cross correlation function for $y_F(t)$ and $x_B(t)$, or for $x_F(t)$ and $x_B(t)$ and integrating the cross correlation function for a given period of time.

8. The neural network processing system of claim 1, wherein input signals to the neural network processing system and output signals from the neural network processing system are unidirectional signals.

9. The neural network processing system of claim 1, wherein both input $x_{Fi}(t)$ and weighted sum $x_{Bi}(t)$ coexist as independent signals in the bidirectional SNC until they are decoupled by the HC.

10. The neural network processing system of claim 1, wherein both input $y_{Fi}(t)$ and weighted sum $y_{Bi}(t)$ coexist as independent signals in the bidirectional SNC until they are decoupled by the HC.

11. The neural network processing system of claim 1, wherein the HC selectively transmits forward signals and backward signals to interface with unidirectional components and bidirectional components.

12. The neural network processing system of claim 1, wherein the weight update unit calculates a cross correlation function of the inputs $y_B(t)$'s and $x_F(t)$'s.

13. A computer-implemented method for concurrent machine learning, comprising:

concurrently transmitting, by a bidirectional Synaptic Network Channel (SNC), weighted sums, $y_F(t)$'s and $x_B(t)$'s, as an elastic wave superposition of inputs, $x_F(t)$'s and $y_B(t)$'s, respectively, each input of the inputs multiplied and added with corresponding weights w's encoded in variable splitters and combiners in a forward direction and a backward direction, respectively;

performing, by unidirectional Signal Reshaping (SR) units, I's and L's inference and learning, respectively, wherein the inference and the learning are based on generating inputs for a following layer of multiple layers in the forward direction and the backward direction from the weighted sums $y_F(t)$'s and $x_B(t)$'s of a current layer of the multiple layers, respectively, wherein the unidirectional SR units I's determine whether to transmit forward spike signals into the following layer during the inference by thresholding and reshaping weighted sums $y_F(t)$'s, the unidirectional SR units L's determine whether to transmit backward spike signals into a preceding layer of the multiple layers by thresholding and reshaping weighted sums $x_B(t)$'s, and the thresholding and the reshaping of the weighted sums $x_B(t)$'s by the unidirectional SR units L's are different from the thresholding and the reshaping of the weighted sums $y_F(t)$'s by the unidirectional SR units I's;

connecting, by a Hybrid Coupler (HC), the bidirectional SNC and the unidirectional SR units; and calculating, by a weight update unit, each weight difference $\Delta w_{ij}$ using an input $y_{Bi}(t)$ or a weighted sum $y_{Fi}(t)$ and an input $x_{Fj}(t)$ to update a weight $w_{ij}$ for the current layer.

14. The computer-implemented method of claim 13, wherein the corresponding weights are shared between the inference and the learning.

15. The computer-implemented method of claim 13, wherein the unidirectional SR units perform the inference and the learning using a Hebbian algorithm.

16. The computer-implemented method of claim 13, wherein the unidirectional SR units perform the inference and the learning using a Spike Time-Dependent Plasticity algorithm.

17. The computer-implemented method of claim 13, wherein the unidirectional SR units perform the inference and the learning using a backpropagation algorithm.

18. The computer-implemented method of claim 13, wherein the unidirectional SR units reshape fragments of spike energies from a plurality of preceding neurons into a single spike signal for next-stage neural communication in the following layer.

19. The computer-implemented method of claim 13, wherein the unidirectional SR units generate the inputs for the following layer in the forward direction and the backward direction from $y_{Fi}(t)$'s or $x_{Fi}(t)$'s of the current layer, and $x_{Bi}(t)$'s of the current layer, respectively, by calculating a cross correlation function for $y_F(t)$ and $x_B(t)$, or for $x_F(t)$ and $x_B(t)$ and integrating the cross correlation function for a given period of time.

20. The computer-implemented method of claim 13, wherein both input $x_{Fj}(t)$ and weighted sum $x_{Bi}(t)$ coexist as independent signals in the bidirectional SNC until they are decoupled by the HC.

21. The computer-implemented method of claim 13, wherein both input $y_{Fj}(t)$ and weighted sum $y_{Bi}(t)$ coexist as independent signals in the bidirectional SNC until they are decoupled by the HC.

22. A computer program product for concurrent machine learning, the computer program product comprising a non-transitory computer readable storage medium having program instructions embodied therewith, the program instructions executable by a computer to cause the computer to perform a method comprising:

concurrently transmitting, by a bidirectional Synaptic Network Channel (SNC), weighted sums, $y_F(t)$'s and $x_B(t)$'s, as an elastic wave superposition of inputs, $x_F(t)$'s and $y_B(t)$'s, respectively, each input of the inputs multiplied and added with corresponding weights w's encoded in variable splitters and combiners in a forward direction and a backward direction, respectively;

performing, by unidirectional Signal Reshaping (SR) units, I's and L's inference and learning, respectively, wherein the inference and the learning are based on generating inputs for a following layer of multiple layers in the forward direction and the backward direction from the weighted sums $y_F(t)$'s and $x_B(t)$'s of a current layer of the multiple layers, respectively, wherein the unidirectional SR units I's determine whether to transmit forward spike signals into the following layer during the inference by thresholding and reshaping weighted sums $y_F(t)$'s, the unidirectional SR units L's determine whether to transmit backward spike signals into a preceding layer of the multiple layers by thresholding and reshaping weighted sums $x_B(t)$'s, and the thresholding and the reshaping of the weighted sums $x_B(t)$'s by the unidirectional SR units L's are different from the thresholding and the reshaping of the weighted sums $y_F(t)$'s by the unidirectional SR units I's;

connecting, by a Hybrid Coupler (HC), the bidirectional SNC and the unidirectional SR units; and calculating, by a weight update unit, each weight difference $\Delta w_{ij}$ using an input $y_{Bi}(t)$ or a weighted sum $y_{Fi}(t)$ and an input $x_{Fj}(t)$ to update a weight $w_{ij}$ for the current layer.

23. A neural network processing system having multiple layers, each layer of the multiple layers comprising:

a bidirectional Synaptic Network Channel (SNC) for concurrently transmitting weighted sums, $y_F(t)$'s and $x_B(t)$'s, as an elastic wave superposition of inputs, $x_F(t)$'s and $y_B(t)$'s, respectively, each input of the inputs multiplied and added with corresponding weights w's encoded in variable splitters and combiners in a forward direction and a backward direction, respectively;

unidirectional Signal Reshaping (SR) units, I's and L's for inference and learning, respectively, wherein the inference and the learning are based on generating inputs for a following layer of the multiple layers in the forward direction and the backward direction from the weighted sums $y_F(t)$'s and $x_B(t)$'s of a current layer of the multiple layers, respectively; and a weight update unit to calculate each weight difference $\Delta w_{ij}$ using an input $y_{Bi}(t)$ or a weighted sum $y_{Fi}(t)$ and an input $x_{Fj}(t)$ to update a weight $w_{ij}$ for the current layer, wherein the unidirectional SR units I's determine whether to transmit forward spike signals into the following layer during the inference by thresholding and reshaping weighted sums $y_{Fi}(t)$'s, the unidirectional SR units L's determine whether to transmit backward spike signals into a preceding layer of the multiple layers by thresholding and reshaping weighted sums $x_{Bi}(t)$'s, and the thresholding and the reshaping of the weighted sums $x_B(t)$'s by the unidirectional SR units L's are different from the thresholding and the reshaping of the weighted sums $y_F(t)$'s by the unidirectional SR units I's.

* * * * *